United States Patent [19]

Holscher et al.

[11] Patent Number: 4,762,721

[45] Date of Patent: Aug. 9, 1988

[54] OIL-IN-WATER EMULSION GLAZING AGENT FOR FOODSTUFFS

[75] Inventors: Ebo J. Holscher, Fijnaart; Nicolaas J. F. D. Verhoef, Maasland; Cynthia M. Ligeon, Vlaardingen, all of Netherlands

[73] Assignee: Thomas J. Lipton, Inc., Englewood Cliffs, N.J.

[21] Appl. No.: 859,060

[22] Filed: May 2, 1986

[30] Foreign Application Priority Data

May 7, 1985 [NL] Netherlands .......................... 8501283

[51] Int. Cl.$^4$ .......................... A23D 5/00; A23L 1/04; A21D 15/08
[52] U.S. Cl. ...................................... 426/94; 426/293; 426/302; 426/303; 426/613; 426/496; 426/653
[58] Field of Search ............... 426/653, 496, 302, 303, 426/661, 613, 94, 293, 585, 573

[56] References Cited

U.S. PATENT DOCUMENTS

| | | | |
|---|---|---|---|
| 3,010,830 | 11/1961 | Berndt et al. | 426/570 |
| 3,088,829 | 5/1963 | Rapaport | 426/94 |
| 3,323,922 | 6/1967 | Durst | 426/103 |
| 3,427,951 | 2/1969 | Mitan et al. | 426/302 |
| 3,449,132 | 6/1969 | Luksas et al. | 426/302 |
| 4,293,572 | 10/1981 | Silva et al. | 426/303 |
| 4,389,420 | 6/1983 | Yong et al. | 426/94 |
| 4,609,555 | 9/1986 | Becker et al. | 426/653 |

OTHER PUBLICATIONS

Food Science & Technology Abstracts, vol. 10 (1978), No. 10, Abstract 10 P 1579.

*Primary Examiner*—Jeanette Hunter
*Attorney, Agent, or Firm*—Brumbaugh, Graves, Donohue & Raymond

[57] ABSTRACT

A glazing agent for bakery products comprises a homogenized emulsion of 10–50 wt. % of an edible oil (e.g. soybean oil), 5–15 wt. % (of the aqueous phase) of a protein (e.g. sodium caseinate), 2–10 wt. % of a thin-boiling starch (e.g. a dextrin) and water. Optionally an emulsifier like lecithin can xanthan gum is being used. The emulsion may be spray-dried.

18 Claims, No Drawings

OIL-IN-WATER EMULSION GLAZING AGENT FOR FOODSTUFFS

The present invention relates to a glazing agent for bakery products such as bread, bread-rolls, biscuits and the like.

It is known that gloss can be imparted to the surface of baked goods by brushing the baked goods, at the place where this gloss is desired, with lightly beaten egg before baking. Indeed, such a glazing agent yields a reasonably well adhering, shiny coating, but the disadvantage thereof is that this agent is expensive, which makes use on industrial scale unattractive. Moreover, the agent has bad keeping qualities.

From experiments it has now appeared that an excellent glazing agent for bakery products can be obtained by providing this agent in the form of a homogenized emulsion of a protein, an edible oil, water and a thin-boiling starch. The homogenized emulsion can be dried and, before use, the dried, homogenized emulsion may be reconstituted with water.

The requirements for a good glazing agent are manifold. On the one hand, good optical properties should be imparted to the baked goods, owing to the glazing agent being present in a smooth, shiny, homogeneous layer on the baked goods. On the other hand the agent must be readily applicable and therefore its rheological properties should be favourable. Lastly, the agent should be suitable for processing on a large industrial scale, in which the microbiological keepability also plays a great role.

With respect to the rheological properties, it has appeared from experiments that the viscosity of the glazing agent is an important property. If the viscosity of the emulsion is too low, the danger exists that the agent tends to form islands or droplets on the goods to be baked, so that, after baking, no firm, shiny, homogeneous film is obtained. Moreover, with a low-viscosity emulsion the solids content is generally too low, so that too much glazing agent has to be applied in order still to obtain sufficient film on the baked goods after baking.

When the viscosity is too high, the glazing agent cannot be applied readily to the goods to be baked and, moreover, the thickness of the film cannot be controlled well and the optical properties of the films are clearly worse (e.g. less gloss). Besides that, the danger of skin formation exists, i.e. that the glaze layer becomes detached locally or completely from the baked goods.

The amount of oil used in the emulsion is important for the flexibility of the film obtained after baking. It has appeared that, when the glazing agent is used in the form of an emulsion, even with prolonged storage at 5° C., when the upper layer of the baked goods is already becoming soft, yet the glaze layer still remains of visually good quality.

The stability of the emulsion is related to the particle size of the emulsion, with small particles indeed quickly giving rise to a high viscosity, but, on the other hand, leading to a stable emulsion. The particle size of the emulsion is also determined by the amount and the type of a possibly used emulsifier, such as e.g. lecithin.

Finally, it has appeared that the stability and the viscosity of the emulsion can also be influenced by the addition of xanthan gum. By this addition, thixotropic properties are imparted to the emulsion, which prevent the emulsion from dripping off when used on curved surfaces.

When the glazing agent, upon heating on the surface of the baked goods, becomes brown too quickly, indeed a smooth and shiny layer is obtained in an early stage of the baking process, but the baked goods have not yet been sufficiently well baked and the further heating necessary for this then leads to deterioration of the quality of the glaze layer. Therefore a good balance should be found between the browing speed of the glazing agent on the one hand and, on the other hand, the baking speed of the goods to be baked.

It has now been found, that a good glazing agent for bakery products, meeting the requirements mentioned above, consists of a homogenized emulsion of a protein, an edible oil, water and a thin-boiling starch. preferably the homogenized emulsion is of the oil-in-water (O/W) type and it consists of sodium caseinate, an edible oil, water and a roasted dextrin starch.

Hence the present invention relates to a glazing agent for bakery products, which is characterized in that it consists of a homogenized emulsion of a protein, an edible oil, water and a thin-boiling starch. Preferably the homogenized emulsion comprises 10 to 50% by weight (calculated on the total emulsion) of an edible oil, from 2 to 10% by weight (calculated on the total emulsion) of a thin-boiling starch, from 5 to 15% by weight (calculated on the weight of the aqueous phase) of a protein, the remainder of the emulsion being water, and the weight ratio between the oil phase and the aqueous phase being from 1:1 to 1:9. Particularly good results were obtained with a glazing agent consisting of a dispersion of from 8 to 12% by weight (calculated on the weight of the aqueous phase) of a protein, from 25 to 35% by weight (calculated on the total emulsion) of an edible oil from 3 to 5% by weight (calculated on the total emulsion) of a thin-boiling starch, the remainder of the emulsion being water, and the weight ratio between the aqueous phase and the oil phase being (1–4):1.

In U.S. Pat. No. 3,323,922 (The Pillsbury Comp.) a coating agent is described that can also be used for the coating of foodstuffs and that consists of three components, namely a film-forming substance (such as e.g. sodium caseinate), a plasticizer for this film-forming substance (such as e.g. water) and a substance which is liquid at the temperature at which the coating is formed and which is immiscible with the plasticizer (e.g. an edible oil or fat). In the examples of this patent specification, a system of sodium caseinate, water and soybean oil is described. In this patent specification however, it is nowhere mentioned or even suggested that this coating agent would be a good glazing agent. On the contrary, it is observed that the excess plasticizer is removed by applying a drying treatment after the coating of the product, in which the temperature should be kept below the boiling point of the plasticizer (thus, in the case of water, below 100° C.). Moreover, the purpose of the coating agent is that it protects the product lying under it against the effects of the atmosphere, and for this purpose this coating agent should lead primarily to a well closed film on the product. The film of a glazing agent, however, should not be closed, because the vapour formed during baking must be able to escape.

The terms "oil" and "fat" are used as synonyms in this description and the claims. The term "oil" relates to mixtures of glycerides, which are liquid at room temperature (18° C.). Such oils can be single oils, but also mixtures of different kinds of oils and/or fat fractions. The oils may have been subjected to various treatments, such as partial hydrogenation, interesterification and the like, and combinations of these treatments. Examples of suitable oils are soybean oil, sunflower oil and maize oil.

The protein used is preferably sodium caseinate, but also other proteins, which yield stable dispersions in combination with the remaining components of the glazing agent can be used, such as soya protein, blood protein, proteins obtained with the aid of microorganisms, partial hydrolysates of proteins and mixtures of these proteins.

The thin-boiling starch is preferably a dextrin and, as such, "Crystal Gum" (Trade-name; a tapioca dextrin ex National Starch Corp.) has appeared to be very effective. But also thin-boiling, modified potato starches and thin-boiling corn starches may be used.

In the preparation of the oil-in-water emulsion it has appeared to be effective to use an emulsifier, for example lecithin, in an amount of 0.5 to 1% by weight, preferably about 0.7% by weight (calculated on the total emulsion). When xanthan gum is used as an emulsion stabilizer, it is used, depending on the desired viscosity, in an amount of up to about 0.25% by weight (calculated on the total emulsion). In practice it has appeared that the glaze emulsion preferably has a dynamic viscosity of 150 to 400 mPas. The viscosity employed is partly determined by the technique used for applying the glazing agent. At this viscosity the emulsion can also be used on industrial scale and it is applied to the goods to be baked, preferably by spraying or atomizing, in an amount of about 30 to 70 mg/cm$^2$. The glazing agent according to the invention can also be applied to the goods to be baked by other means than spraying. Moreover, it can be applied shortly or just before baking, but it can also be applied to dough products which are subsequently deep-frozen, then thawed and finally baked.

The present invention also relates to a process for the preparation of a glazing agent according to the invention.

In a first process, the protein is mixed with the thin-boiling starch and this mixture is kneaded with a portion of the water to a paste which is allowed to stand for one night at 5° C. Subsequently the rest of the water, which has been heated to 75° C., is stirred together with the paste until all lumps have disappeared. The edible oil (possibly mixed with the emulsifier) is then added to the slurry thus obtained, with intensive stirring for 15–30 minutes. The emulsion obtained is then homogenized under pressure (e.g. 200 bar).

In a modification of this process, the thin-boiling starch is first boiled with an amount of water such that an approximately 25 wt.% solution in water is obtained, whereafter this solution is mixed with the paste of the protein and another portion of the water, until all lumps has disappeared. Thereafter, with very intensive mixing, the edible oil (possibly mixed with the emulsifier) is added, whereafter the emulsion obtained is homogenized under pressure.

In a second process according to the present invention, the glazing agent is obtained by dispersing the sodium caseinate together with the thin-boiling starch in the edible oil (in which the optional emulsifier has been dissolved), whereafter the slurry obtained is mixed, while stirring, with hot water (heated to about 75° C.). Finally, the emulsion is cooled to about 30° C. and homogenized at a pressure of, for example, 200 bar.

From tests, it has appeared that if the thin-boiling starch as such used as glazing agent, it yielded a glaze layer that was too hard and lacked flexibility and that, as a result of mechanical handling of the baked goods, such as e.g. the packaging thereof, quickly became detached from baked goods. In combination with the other components of the glazing agent according to the present invention, however, the thin-boiling starch appeared to be an excellent viscosity regulator, which substantially contributed to the smoothness of the surface and which also brought about a good balance between the browning speed of the glazing agent and the baking speed of the goods to be baked.

It has also appeared that it is possible to dry the oil-in-water emulsion, preferably by spray-drying. In spite of the high oil content of the glazing agent, a non-sticky, free-flowing powder is obtained that can be rehydrated to an oil-in-water emulsion both with cold and with hot water. The advantage of this embodiment of the invention is that in this way the glazing agent can be provided in a form with good keepability, which is of great importance particularly for use on industrial scale.

The invention will now be further explained with the help of the following non-limiting examples.

EXAMPLE I 6.3% by weight (calculated on the total emulsion) of sodium caseinate was mixed with 5.0% by weight of "Crystal Gum" (Trade-name; ex National Starch Corp.), whereafter 30.0% by weight of soybean oil mixed with 0.7% by weight of lecithin (both amounts calculated on the total emulsion) heated to 75° C. were mixed with the mixture of sodium caseinate and "Crystal Gum" to a homogeneous slurry. Subsequently, with intensive stirring, this slurry was mixed with 58% by weight of water of 80° C. (calculated on the total emulsion). The emulsion obtained was cooled and homogenized at 200 bar.

The emulsion was sprayed onto the lids of meat pies in an amount of 30 to 60 mg/cm$^2$, whereafter the pies were baked in an oven with forced air current for 20–25 min. at 220° C.

Meat pies were obtained with an attractive, smooth homogeneous film, which had an excellent gloss.

EXAMPLE II

With the aid of a kneading machine, a paste was formed from 6.3% by weight (calculated on the total emulsion) of sodium caseinate and 11.6% by weight (calculated on the total emulsion) of water. This paste was allowed to stand for one night at 5° C.

Subsequently a 25 wt.% solution of "Crystal Gum" (Trade-name; ex National Starch Corp.) in water was prepared by boiling the appropriate amount of "Crystal Gum" in water. The solution was cooled to room temperature and an amount of it, such that in total 5.0% by weight of "Crystal Gum" (calculated on the total emulsion) was added, was mixed with the paste of the sodium caseinate. Stirring was carried out until all lumps had disappeared. Finally, under very vigorous stirring, 30.0% by weight of soybean oil mixed with 0.7% by weight of lecithin (both calculated on the total emulsion) was added to the slurry of sodium caseinate and "Crystal Gum", after which stirring was carried out for a further 30 minutes and the emulsion obtained was subsequently homogenized at 200 bar.

The emulsion was applied to puff-pastry biscuits in an amount of about 50 mg/cm$^2$, whereafter they were baked in an oven with forced air current for 20 min. at 220° C.

EXAMPLE III

With the aid of a powder mixer, a homogeneous mixture was made of 6.3% by weight of sodium caseinate, 5.0% by weight of thin-boiling starch ("Crystal-Gum"; Trade-name; ex National Starch Corp.), 0.2% by weight of common salt and 0.1% by weight of xanthan gum (all amounts calculated on the total emulsion).

This powdery mixture was added at 30° C., with stirring, to 35% by weight soybean oil (calculated on the total emulsion) to which 0.7% by weight of soya lecithin (calculated on the total emulsion) had been added beforehand. After the slurry had been homogeneously distributed, water of 80° C. was added under stirring, and in an amount of 100% by weight calculated on the emulsion.

After being stirred for about 15 minutes, the mixture was homogenized at a temperature of 65° C. and subsequently the emulsion was pasteurised for 20 sec. at 80° C. in a plate heat exchanger and finally cooled to 10° C.

After storage for 14 hours at 10° C. the emulsion was sprayed onto splices of puff pastry with the aid of a high pressure spraying pistol, which slices were subsequently baked for 20 minutes at 220° C. After application and before and during the baking, the glazing agent displayed no tendency towards dripping off or to island or droplet formation.

After baking, the glaze formed a smooth, closed, glossy layer on the puffy pastry.

EXAMPLES IV–VII

With the aid of a powder mixer, a homogeneous mixture was made of the sodium caseinate, the thin-boiling starch, the common salt and the xanthan gum in the amounts as indicated in Table I (all amounts calculated on the total emulsion).

The powdery mixture obtained was added with stirring to the soybean oil (at 70° C.) to which the soya lecithin had been added while stirring at 70° C. After the slurry had been homogeneously distributed, water of 70° C. was added under stirring, and, after being stirred for 15 minutes, the mixture was homogenized at a temperature of 65° C. and subsequently the emulsion was pasteurised for 20 sec. at 80° C. in a plate heat exchanger and finally cooled to 10° C.

TABLE I

| Example | IV | V | VI | VII |
|---|---|---|---|---|
| Soybean oil | 30.0% | 30.0% | 30.0% | 30.0% |
| Sodium caseinate | 6.3% | 6.3% | 6.3% | 6.3% |
| Crystal Gum | 5.0% | — | — | — |
| Soya lecithin | 0.7% | 0.7% | 0.7% | 0.7% |
| Xanthan gum | 0.05% | 0.05% | 0.05% | 0.05% |
| Sodium chloride | 0.1% | 0.1% | 0.1% | 0.1% |
| Water | 57.85% | 57.85% | 57.85% | 57.85% |
| Mor Sweet 01924[1] | — | 5.0% | — | — |
| Perfactamyl gel[2] | — | — | 5.0% | — |
| Perfactamyl gel 45[3] | — | — | — | 5.0% |

All percentages are weight percentages, based on the final emulsion.
[1] A hydrolysate, obtained by acid hydrolysis of corn starch, ex CPC; Trade Mark.
[2] An oxidised potato starch, ex Avebe, The Netherlands; Trade Mark.
[3] A starch acetate, ex Avebe, The Netherlands; Trade Mark.

The final emulsion in all examples was sprayed onto slices of puff pastry with the aid of a high pressure spraying pistol in a thickness of 2 mm, after which the slices were baked for 15 minutes at 210° C. In Examples VI and VII 75 grams of the total emulsion were diluted with 25 grams of water before being sprayed onto the puff pastry.

After baking, the glaze formed a smooth, closed, glossy layer on the puff party.

We claim:

1. A homogenized oil-in-water emulsion glazing agent for bakery products, consisting essentially of from 5 to 15% by weight of the aqueous phase of the emulsion of a protein, from 10 to 50% by weight of the total emulsion of an edible oil, from 2 to 10% by weight of the total emulsion of a starch component consisting of a thin-boiling starch, and water, in which the weight ratio between the oil phase and the aqueous phase is from 1:1 to 1:9.

2. A homogenized oil-in-water emulsion glazing agent for bakery products, consisting essentially of emulsion from 8 to 12% by weight of the aqueous phase of the emulsion of a protein, from 25 to 30% by weight of the total emulsion of an edible oil, from 3 to 5% by weight of the total emulsion of a starch component consisting of a thin-boiling starch, and water.

3. A glazing agent according to claim 1 or 2, wherein the protein is sodium caseinate.

4. A glazing agent according to claims 1 or 2, wherein the edible oil is soybean oil.

5. A glazing agent according to claims 1 or 2, wherein the thin-boiling starch is a dextrin.

6. A glazing agent according to claims 1 or 2, wherein the thin-boiling starch is a modified potato starch or a corn starch.

7. A glazing agent according to claims 1 or 2, wherein the emulsion it comprises from 0.5 to 1% by weight of the total emulsion of an emulsifier.

8. A glazing agent according to claim 7, wherein the emulsifier is lecithin.

9. A glazing agent according to claims 1 or 2, wherein the emulsion comprises up to 0.25% by weight of the total emulsion of xanthan gum.

10. A glazing agent according to claims 1, or 2, wherein the emulsion is in a dried form.

11. A process for preparing a glazing agent for a bakery product in the form of an emulsion comprising the steps of:
(a) preparing a slurry in water of 5% to 15% by weight of the aqueous phase of the emulsion of a protein, and from 2% to 10% by weight of the total emulsion of a thin-boiling starch;
(b) mixing the slurry with from 10% to 50% by weight of the total emulsion of a heated edible oil;
(c) dispersing the mixture thus obtained with an amount of heated water such that an oil-in-water emulsion is formed in which the weight ratio of oil phase to aqueous phase is from 1:1 to 1:9; and
(d) cooling and homogenizing the oil-in-water emulsion.

12. A process according to claim 11, wherein the heated edible oil and the heated water are heated to a temperature of 70° to 80° C. and the oil-in-water emulsion is cooled to 25° to 30° C. and is homogenized at a pressure of 180 to 220 bar.

13. A process according to claim 11, wherein the cooled and homogenized oil-in-water emulsion is subsequently dried.

14. A process according to claim 13, wherein the emulsion is spray dried.

15. A process for preparing a glazing agent for bakery products in the form of an emulsion comprising the steps of:
(a) dispersing from 5% to 15% by weight of the aqueous phase of the emulsion of a dry powdered protein, and from 2% to 10% by weight of a dry powdered thin-boiling starch in from 10% to 50% by weight of the total emulsion of an edible oil at 70° to 80° C.;

(b) adding an amount of water at 70° to 80° C. to the dispersion to form an oil-in-water emulsion such that the weight ratio between the oil phase and the aqueous phase of the emulsion is from 1:1 to 1:9;

(c) homogenizing the emulsion at a pressure of 180 to 220 bar;

(d) pasteurizing the homogenized emulsion for about 20 seconds at about 80° C.; and (e) cooling the pasteurized, homogenized oil-in-water emulsion to below 20° C.

16. A process according to claim 15, wherein the cooled emulsion is subsequently dried.

17. A process according to claim 16, wherein the emulsion is spray-dried.

18. Baked products that are at least partly glazed with the glazing agent according to claims 1 or 2.

* * * * *

UNITED STATES PATENT AND TRADEMARK OFFICE
CERTIFICATE OF CORRECTION

PATENT NO. : 4,762,721
DATED : August 9, 1988
INVENTOR(S) : Ebo-Jan Holscher et al It is certified that error appears in the above-identified patent and that said Letters Patent is hereby corrected as shown below:

Column 5, line 22, "splices" should read --slices--.

Column 6, line 15, delete "emulsion",

Column 6, line 20, "claim" should read --claims--.

Signed and Sealed this

Ninth Day of May, 1989

Attest:

DONALD J. QUIGG

Attesting Officer

Commissioner of Patents and Trademarks